(12) United States Patent
Sridharan

(10) Patent No.: US 11,012,511 B1
(45) Date of Patent: May 18, 2021

(54) SMART NETWORK INTERFACE CONTROLLER FOR CACHING DISTRIBUTED DATA

(71) Applicant: Facebook, Inc., Menlo Park, CA (US)

(72) Inventor: Srinivas Sridharan, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/742,635

(22) Filed: Jan. 14, 2020

(51) Int. Cl.
| | |
|---|---|
| *H04L 29/08* | (2006.01) |
| *H04L 29/06* | (2006.01) |
| *H04W 92/18* | (2009.01) |
| *G06F 16/22* | (2019.01) |
| *G06F 16/2455* | (2019.01) |
| *G06F 16/2453* | (2019.01) |

(52) U.S. Cl.
CPC ...... *H04L 67/1097* (2013.01); *G06F 16/2282* (2019.01); *H04L 67/10* (2013.01); *H04L 67/2842* (2013.01); *H04L 69/12* (2013.01); *H04L 69/161* (2013.01); *H04L 69/22* (2013.01); *H04W 92/18* (2013.01); *G06F 16/2455* (2019.01); *G06F 16/24544* (2019.01)

(58) Field of Classification Search
None
See application file for complete search history.

(56) References Cited

U.S. PATENT DOCUMENTS

| | | | | |
|---|---|---|---|---|
| 7,116,764 B1 * | 10/2006 | Russell | ................. | H04M 3/533 379/88.13 |
| 8,943,271 B2 * | 1/2015 | Krishnaprasad | .... | G06F 12/0833 711/120 |
| 9,350,828 B2 * | 5/2016 | Frachtenberg | .......... | H04L 69/12 |
| 9,436,651 B2 * | 9/2016 | Underwood | ............ | H04L 45/38 |
| 9,811,463 B2 * | 11/2017 | Gertner | ................... | G06F 3/065 |
| 9,952,971 B2 * | 4/2018 | Krishnaprasad | .... | G06F 12/0811 |
| 10,394,928 B2 * | 8/2019 | Yen | .......................... | G06F 17/13 |
| 10,642,738 B1 * | 5/2020 | Parakh | ................ | G06F 12/0813 |
| 2002/0091844 A1 * | 7/2002 | Craft | ....................... | H04L 69/18 709/230 |
| 2006/0136697 A1 * | 6/2006 | Tsao | ..................... | G06F 12/1027 711/206 |
| 2006/0221720 A1 * | 10/2006 | Reuter | .................. | G06F 3/0653 365/189.05 |
| 2012/0185614 A1 * | 7/2012 | Reed | ................. | G06F 15/17356 709/250 |
| 2013/0246552 A1 * | 9/2013 | Underwood | .............. | H04L 1/12 709/212 |
| 2014/0040506 A1 * | 2/2014 | Frachtenberg | .......... | H04L 69/12 709/250 |
| 2015/0331807 A1 * | 11/2015 | Lie | ....................... | G06F 12/1063 711/118 |
| 2016/0234317 A1 * | 8/2016 | Frachtenberg | .......... | H04L 69/12 |
| 2018/0081715 A1 * | 3/2018 | LeBeane | ................. | G06F 9/505 |

(Continued)

*Primary Examiner* — Lashonda T Jacobs
(74) *Attorney, Agent, or Firm* — Van Pelt, Yi & James LLP

(57) ABSTRACT

A request for data from a distributed table is received at a network interface controller system. The request for data from the distributed table is identified as a request to be processed by the network interface controller system instead of a processor of a host computer system. The requested data is requested and received from a memory of the computing host computer system via a computer interface of the network interface controller system. The received requested data is caused to be cached in a cache of the network interface controller system.

20 Claims, 9 Drawing Sheets

(56) References Cited

U.S. PATENT DOCUMENTS

2018/0150521 A1* 5/2018 Skalkowski ...... G06F 16/24544
2018/0307420 A1* 10/2018 Yoon ..................... G06F 3/0688
2018/0349477 A1* 12/2018 Jaech .................. G06F 16/9535
2019/0114362 A1* 4/2019 Subbian ............ G06F 16/24578

* cited by examiner

SMART NETWORK INTERFACE CONTROLLER FOR CACHING DISTRIBUTED DATA

BACKGROUND OF THE INVENTION

An embedding is a table comprised of a plurality of entries. Each entry may be associated with a plurality of elements. For example, an embedding table may be comprised of a million entries, where each of the entries is comprised of 64 elements. Embedding tables may be used to represent different things, such as movies, people, items, etc. Embedding tables may be used for recommendation purposes. For example, entries that are similar to each other may be recommended. An embedding table may be stored in memory. However, due to the large size of the embedding table, the embedding table may use a lot of available memory. This may reduce system performance since a large portion of the memory that could be used for other purposes is reserved for storing the embedding table.

BRIEF DESCRIPTION OF THE DRAWINGS

Various embodiments of the invention are disclosed in the following detailed description and the accompanying drawings.

DETAILED DESCRIPTION

Figure 1:
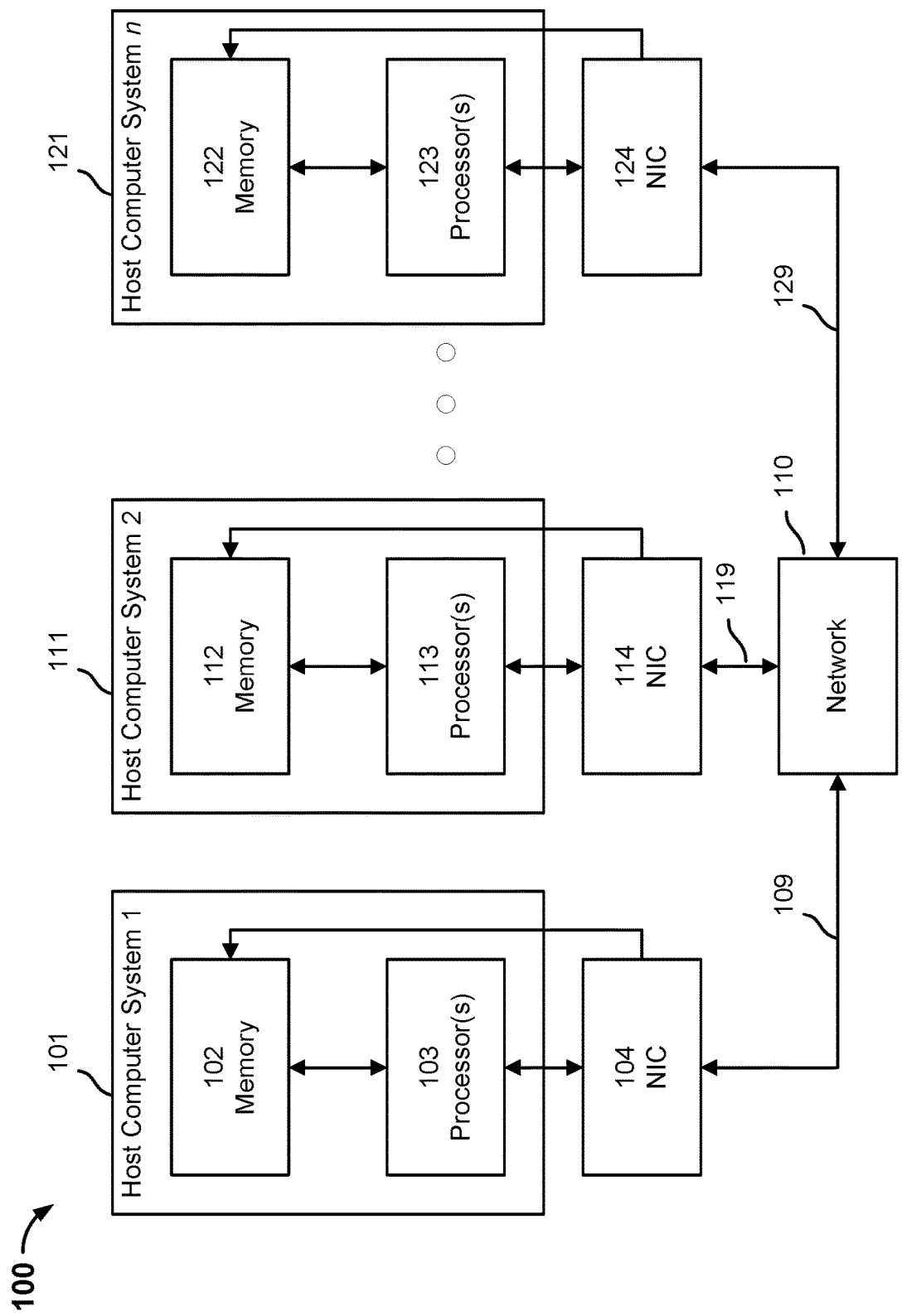
FIG. 1 is a block diagram illustrating a distributed computing system in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A distributed computing system may be comprised of a plurality of host computer systems. Each of the host computer systems may have a corresponding processor (e.g., CPU, GPU, etc.) and a corresponding memory. Each of the host computer systems may be coupled to a corresponding network interface controller (NIC). In some embodiments, a NIC is integrated into the host computer system (e.g., expansion card, removable device, integrated on motherboard, etc.). In some embodiments, a NIC connected to a host computer system via a computer bus (e.g., PCI, PCI-e, ISA, etc.). The NIC is configured to provide network access (e.g., Ethernet, Wi-Fi, Fiber, FDDI, LAN, WAN, SAN, etc.) to the host computer system with which it is associated.

Each of the plurality of host computer systems may be configured to implement a corresponding machine learning model to output a corresponding prediction. Examples of machine learning models implemented by the distributed computing system, include, but are not limited to, a neural network model, a deep learning model, etc. A machine learning model may be comprised of a plurality of layers. Each layer may be associated with a corresponding weight. Input data may be applied to an initial layer of the machine learning model. An output of the initial layer may be provided as input to a next layer of the machine learning model. The forward pass may continue until the last layer of the machine learning model receives as input, an output from the second to last layer of the machine learning model is received. The last layer of the machine learning model may output a prediction.

Each host computer system of the distributed computing system may be configured to implement a different version of a machine learning model, that is, the weights associated with each layer of the machine learning models may be different. For example, a first machine learning model may have a first weight associated with the first layer, a second machine learning model may have a second weight associated with the first layer, . . . , and an nth machine learning model may have an nth weight associated with the first layer. A first machine learning model may have a first weight associated with the second layer, a second machine learning model may have a second weight associated with the second layer, . . . , and an nth machine learning model may have an nth weight associated with the second layer. A first machine learning model may have a first weight associated with the nth layer, a second machine learning model may have a second weight associated with the nth layer, . . . , and an nth machine learning model may have an nth weight associated with the nth layer.

The distributed computing system may apply data associated with an embedding table to each of the corresponding machine learning models of the host computer systems. Storing the data associated with an embedding table in a single host computer system may overburden the resources of the single host computer system. For example, storing the data associated with an embedding table may use a large portion of available memory of the single host computer system. This may reduce system performance of the single host computer system since the large portion of the memory that could be used for other purposes is reserved for storing the embedding table. To reduce the burden on the single host computer system, the data associated with an embedding table may be distributed across the plurality of host computer systems such that each of the host computer systems stores a portion of the distributed table.

A first host computer system may request data from each of the other host computer systems of the distributed computing system and receive the requested data to perform a forward pass. For example, the first host computer system may request some or all of the distributed table portion stored by a second host computer system of the distributed computing system. The request may be received at a NIC of the second host computer system. The request may be provided from the NIC of the second host computer system to the processor of the second host computer system. In response to the request, the processor of the second host computer system may perform a lookup and retrieve the requested data from the memory of the second host computer system and provide the requested data to the first host computer system via the NIC of the second host computer system.

After the requested data has been received from each of the other host computer systems, the first host computer system may combine the received data with the data associated with its distributed table portion to generate an input dataset for the machine learning model of the first host computer system. The input dataset may be applied to the machine learning model associated with the first host computer system. The machine learning model associated with the first host computer system may output a prediction. The first host computer system may receive feedback based on its prediction. For example, the first host computer system may predict a user associated with a social media platform is interested in a particular product and the first host computer system may receive feedback (direct or indirect) from the user indicating whether the user is interested in the particular product.

The first host computer system may use the feedback to update its corresponding machine learning model. For example, the first host computer system may use the feedback to update weights associated with each of the plurality of layers of the machine learning model. The first host computer system may also use the feedback to update its corresponding distributed table portion. For example, an entry of the distributed table may represent the user's interests. The element values of the entry may be adjusted based on the feedback to provide a more accurate representation of the user interests.

While the first host computer system is performing a forward pass to output a prediction, the other host computer systems of the distributed system may also be performing corresponding forward passes in parallel to output corresponding predictions. The other host computer systems may also receive corresponding feedback based on their corresponding predictions and use the corresponding feedback to update their corresponding models and corresponding distributed table portions.

Updating the corresponding machine learning models of the host computer systems may comprise the host computer systems performing weight gradient communications and sharing corresponding weights associated with each of the machine learning model layers to determine a collective weight for each of the machine learning model layers. For example, the first host computer system may provide to the other host computer systems an updated weight associated with a last layer of machine learning model. The other host computer systems may provide to the first host computer system corresponding updated weights associated with the last layer of the machine learning model. The host computer systems, i.e., the first host computer system and the other host computer systems, may determine a collective weight for the last layer of the machine learning model. The host computer systems may perform this process each time a layer of the machine learning model is updated. The host computer systems may collectively determine updated values for the distributed table. For example, the distributed table may be an embedding table that represents an entity. Elements of the embedding may be updated to more accurately represent the entity. The updated values may be provided to a processor associated with a host computer system via a NIC associated with the host computer system. In response to receiving the updated values, the processor associated with the host computer system may lookup the distributed table portion stored in memory, retrieve the distributed table portion from memory, and update the retrieved distributed table portion with the updated values.

One limiting factor in the above process is that each processor has a finite number of cores. Some of the cores may be used to perform compute operations. Some of the cores may be used to perform communication operations. Each lookup operation performed by a processor has an associated lookup time and requires an associated amount of communication cores. Each time a processor of a host computer system performs a lookup operation associated with its distributed table portion stored by the memory of the host computer system, the processor is using a core for a communication operation instead of using the core for a compute operation. This may create a bottleneck for the distributed computing system because instead of using the cores to perform compute operations (e.g., to perform the forward pass prediction or to determine a collective weight in a back propagation), the cores will be used for communication operations because a plurality of host computer systems may be requesting from a host computer system data associated with the distributed table portion stored by the host computer system. The processor of a host computer system may perform a plurality of predictions in parallel, further exacerbating the demand for compute cores. Each of the host computer systems of the distributed system may experience this problem since they are separately performing forward pass predictions and back propagation updates.

The bottleneck may be reduced by using a NIC to offload the lookup operations performed by a host computer system processor. A NIC may include a controller and a cache storage. The NIC may send to the host computer system processor a request for some or all of the distributed table portion stored in a memory of the host computer system. For example, the request may be for the most frequently entries of the distributed table portion stored in the memory of the host computer system. In response to the request, the host computer system processor may perform a lookup for the requested distributed table portion and provide to the NIC the requested distributed table portion. The NIC may store the requested distributed table portion in a cache storage of the NIC. For example, the distributed table portion stored in a memory of the host computer system may store a million entries and the distributed table portion stored in a cache storage of the NIC may store thousands of entries. Storing some of the entries of the distributed table portion in a cache storage of the NIC may reduce the bottleneck because after the host computer system processor performs the initial lookup, instead of using some of the processor cores for communication operations, the processor cores may be used for compute operations.

The NIC of a first host computer system may receive from a second host computer system a request for data. A NIC controller may determine whether the request is associated with cacheable data (e.g., data associated with a distributed table). The request may include an indication that the request is for data associated with the distributed table stored by the host computer system. For example, the indication may be a series of data bits included in a header of the request. A NIC controller may inspect the request to determine whether the request includes the indication. In the event the request includes the indication (i.e., the request is not associated with cacheable data), the NIC controller may determine whether the requested data is stored in the cache storage of the NIC. In the event the requested data is stored in the cache storage of the NIC, the NIC controller may provide to the requesting host computer system the requested data. In the event the request includes the indication, but the requested data is not stored in the cache storage of the NIC (e.g., the request is for data associated an entry that is not frequently requested), the NIC controller may provide the request to the processor of the host computer system to which the NIC is associated and the processor of the host computer system may perform the lookup as described above. In the event the request does not include the indication (i.e., the request is not associated with cacheable data), the NIC controller may provide the request to the processor of the host computer system to which the NIC is associated and the processor of the host computer system may perform the lookup as described above.

Each of the NICs of the distributed system may request part of the corresponding distributed table portions stored by their corresponding host computer systems and store the requested data in corresponding cache storage associated with each of the NICs. The distributed computing system may make a plurality of predictions using the distributed table. Instead of each host computer system having to perform a lookup in memory for each prediction, the data may be retrieved from the cache storages of the NICs. This reduces the amount of time needed to fulfill the request because the request may be quickly fulfilled by the NIC controllers instead of waiting for the processor of a host computer system to obtain a core to perform the lookup operation, performing the lookup operation, and providing the data associated with the lookup operation to the requesting host computer system. This also frees up the processor cores of a host computer system to be used for compute operations instead of communication operations.

Each of the host computer systems may output a corresponding prediction, receive corresponding feedback, and update their corresponding machine learning models. After the updates to the corresponding machine learning models are performed, the corresponding distributed table portions stored in the cache storages may be updated by their corresponding NIC controllers. The corresponding distributed table portions may be updated to provide a more accurate representations of the entities associated with the entries of the distributed table. The NIC controllers may then directly update the corresponding memories of the host computer systems to which the NIC controllers are associated. This frees up resources of the host computer system processor because instead of the host computer system processor performing a lookup of the distributed table, retrieving the data from memory, and updating the retrieved data, the NIC controller may directly update the distributed table stored in the memory of the host computer system.

FIG. 1 is a block diagram illustrating a distributed computing system in accordance with some embodiments. In the example shown, distributed computing system 100 is comprised of host computer system 101, host computer system 111, and host computer system 112. Although three host computer systems are depicted, distributed computing system 100 may be comprised of n host computer systems. Host computer systems 101, 111, 112 are connected to each other via network 110. Network 110 may be a LAN, WAN, intranet, the Internet, and/or a combination thereof. Connections 109, 119, 129 may be a wired or wireless connection.

Host computer system 101 is comprised of memory 102 and processor(s) 103. Host computer system 101 is coupled to NIC 104. Host computer system 111 is comprised of memory 112 and processor(s) 113. Host computer 111 is coupled to NIC 114. Host computer system 121 is comprised of memory 122 and processor(s) 123. Host computer 121 is coupled to NIC 124. In some embodiments, NICs 104, 114, 124 are integrated into host computer system 101, 111, 121 (e.g., expansion card, removable device, integrated on motherboard, etc.), respectively. In some embodiments, NICs 104, 114, 124 are connected to host computer system 101, 111, 121, respectively, via a computer bus (e.g., PCI, PCI-e, ISA, etc.). NICs 104, 114, 124 are configured to provide network access (e.g., Ethernet, Wi-Fi, Fiber, FDDI, LAN, WAN, SAN, etc.) to the host computer system with which it is associated.

A table, such as an embedding table, is comprised of a plurality of entries. Each entry may be associated with a plurality of elements. For example, a table may be comprised of millions of entries, where each of the entries is comprised of 64 elements. Instead of storing the table in the memory of a single host computer system, the table may be distributed across the distributed computing system 100. For example, memory 102 may store a first distributed table portion, memory 112 may store a second distributed table portion, . . . , and memory 122 may store an nth distributed table portion. This reduces the dependency of distributed computing system 100 on a single compute node and its corresponding memory for performing predictions. The memories 102, 112, 122 may store a plurality of distributed table portions associated with different distributed tables. For example, memory 102 may store a first distributed table portion associated with users and a first distributed table portion associated with items (e.g., movies, products, services, goods, etc.). Memory 112 may store a second distributed table portion associated with users and a second distributed table portion associated with items. Memory 122 may store an nth distributed table portion associated with users and an nth distributed table portion associated with items.

Processors 103, 113, 123 may be a computer processing unit (CPU), a graphics processing unit (GPU), or any other type of processing unit. Processors 103, 113, 123 may be configured to implement a corresponding machine learning model. Examples of machine learning models implemented by distributed computing system 100, include, but are not limited to, a neural network model, a deep learning model, etc. A machine learning model may be comprised of a plurality of layers. Each layer may be associated with a corresponding weight.

The machine learning models implemented by each of the processors 103, 113, 123 may be different. For example, the weights associated with each layer of a machine learning model may be different based on the processor on which the machine learning model is executed. The machine learning model executed by processor 103 may have a first weight associated with the first layer, the machine learning model executed by processor 113 may have a second weight associated with the first layer, . . . , and the machine learning model executed by processor 123 may have an nth weight associated with the first layer. The machine learning model executed by processor 103 may have a first weight associated with the second layer, the machine learning model executed by processor 113 may have a second weight associated with the second layer, . . . , and the machine learning model executed by processor 123 may have an nth weight associated with the second layer. The machine learning model executed by processor 103 may have a first weight associated with the nth layer, the machine learning model executed by processor 113 may have a second weight associated with the nth layer, . . . , and the machine learning model executed by processor 123 may have an nth weight associated with the nth layer.

The host computer systems 101, 111, 121 may work together to solve a problem. For example, host computer systems 101, 111, 121 may determine whether a particular user is interested in a particular item. Host computer systems 101, 111, 121 may implement corresponding machine learning models to predict whether the particular user is interested in the particular item.

Host computer systems 101, 111, 121 may share their corresponding distributed table portions to perform a prediction. For example, host computer system 101 may share with host computer systems 111, 121 via NIC 104 the distributed table portion stored in memory 102. Similarly, host computer system 111 may share with host computer systems 101, 121 via NIC 114 the distributed table portion stored in memory 112 and host computer system 121 may share with host computer systems 101, 111 via NIC 124 the distributed table portion stored in memory 122. To share a distributed table portion, a processor, such as processor(s) 103, 113, 123, may perform a lookup of the distributed table portion and retrieve data associated with the distributed table portion from a corresponding memory, such as memory 102, 112, 122. Processors 103, 111, 123 may have to perform this lookup and retrieve steps each time a prediction is made in distributed computing system 100.

A processor is comprised of a finite number of cores. A core may perform a compute operation, such as a restore compute, or a communication operation, such as a lookup. The processor needs to use one or more of the cores to perform the lookup. Cores that are used to perform communication operations reduces the total number of available cores to perform compute operations. This may create a bottleneck when the host computer systems 101, 111, 121 are trying to solve a problem because there may not be enough cores to perform communication operations when data associated with a distributed table portion stored in memory needs to be shared with other host computer systems or there may not be enough cores to perform compute operations when data associated with a distributed table portion needs to be applied to a machine learning model.

Host computer systems 101, 111, 121 may perform several predictions within a time period (e.g., hundreds, thousands, millions). Each time a processor performs a lookup, the number of cores available for compute operations is reduced, which may reduce the prediction time of distributed computing system 100. The number of cores available for compute operations may be increased by storing some of the data associated with a distributed table portion in a cache storage of a NIC. For example, the distributed table portion stored in a memory of a host computer system may be comprised of a million entries. A subset of the distributed table portion (e.g., a few thousand entries) may be stored in a cache storage of a NIC. When NIC 104 receives a request for data associated the distributed table portion stored in memory 102, NIC 104 may determine if some or all of the requested portion is stored in a cache storage of NIC 104. In the event the requested data is stored in the cache storage of NIC 104, NIC 104 may provide the requested data to the requesting host computer system. This may reduce the number of lookup operations performed by processor 103. In the event the requested data is not stored in the cache storage of NIC 104, NIC 104 may provide the request to processor 103, which in response, may perform a lookup and retrieve the requested data from memory 102, and provide the retrieved data to the requesting host computer system via 104. NIC 114, 124 may also store some of the data associated with the distributed table portions stored in memory 112, 122, respectively, in corresponding cache storages of NICs 114, 124. Storing some of the data associated with the distributed table portions in the cache storages of the NICs may reduce the overall prediction time since the number of lookup operations performed by the processors 103, 113, 123 may be reduced.

Processors 103, 113, 123 may output a prediction after the data associated with a plurality of distributed table portions are inputted to their corresponding machine learning models. A machine learning model may be comprised of a plurality of levels. The data associated with the plurality of distributed table portions may be inputted to an initial layer of the machine learning model. The output of the initial layer of the machine learning model may be provided to a second layer of the machine learning model. The output of a previous layer of the machine learning model may be inputted to a subsequent layer of the machine learning model. This process may repeat until the output of a second-to-last layer of the machine learning model is provided to a last layer of the machine learning model. The last layer of the machine learning model may output a value. In some embodiments, the value corresponds to a prediction.

After the machine learning models output a value, processors 103, 113, 123 may receive feedback based on their predictions and determine that their corresponding machine learning models need to be updated. For example, the first host computer system may predict a user associated with a social media platform is interested in a particular product and the first host computer system may receive feedback (direct or indirect) from the user indicating whether the user is interested in the particular product. The first host computer system may use the feedback to update its corresponding machine learning model.

Processors 103, 113, 123 may start with their corresponding last layers and determine an updated weight associated with their corresponding last layers. Processors 103, 113, 123 may share their determined updated weights associated with their corresponding last layers. Processors 103, 113, 123 may determine a collective updated weight for the corresponding last layers and update their corresponding machine learning models based on the collective updated weight. Processors 103, 113, 123 may proceed to the second-to-last layer to determine a collected updated weight for the second-to-last layer. Processors 103, 113, 123 may share their determined updated weights associated with their corresponding second-to-last layers. Processors 103, 113, 123 may determine a collective updated weight for the corresponding second-to-last layers and update their corresponding machine learning models based on the collective updated weight. Processors 103, 113, 123 may proceed to the next layer and continue to update the next layer as described above. The update process continues until the initial layer is reached and updated.

After the initial layer of the corresponding machine learning models are updated, the data associated with a distributed table portion may be updated. An entry of a distributed table portion may be updated to provide a better representation of an entity (e.g., person, goods, service, movie, item, etc.) to which the distributed table portion is associated. In some embodiments, the entry of the distributed table portion to be updated is stored in a cache storage of the NIC. The entry of the distributed table portion stored in the cache storage may be updated instead of sending the update request to the processor of a host computer system. If there update request were to be sent to the processor of the host computer system, the processor of the host computer system would need to use one or more cores to look up the entry of the distributed table portion associated with the update, update the entry, and store the updated entry in memory of the host computer system. Updating the distributed table portion stored in the cache storage of the NIC frees up processor cores to perform compute processes. In some embodiments, data is expelled from the cache storage using a least recently used policy. After the cache storage of a NIC is updated, the NIC may directly update the distributed table portion stored in a memory of a host computer system with the updated portion stored in the cache storage. In some embodiments, after the cache storage of a NIC is updated, the NIC indirectly updates the distributed table portion stored in memory of the host computer system with the updated portion stored in the cache storage by providing the updated portion stored in the cache storage to the processor of the host computer system when the processor has an abundant amount of cores (e.g., more than a threshold amount) available to perform the update.

Figure 2:
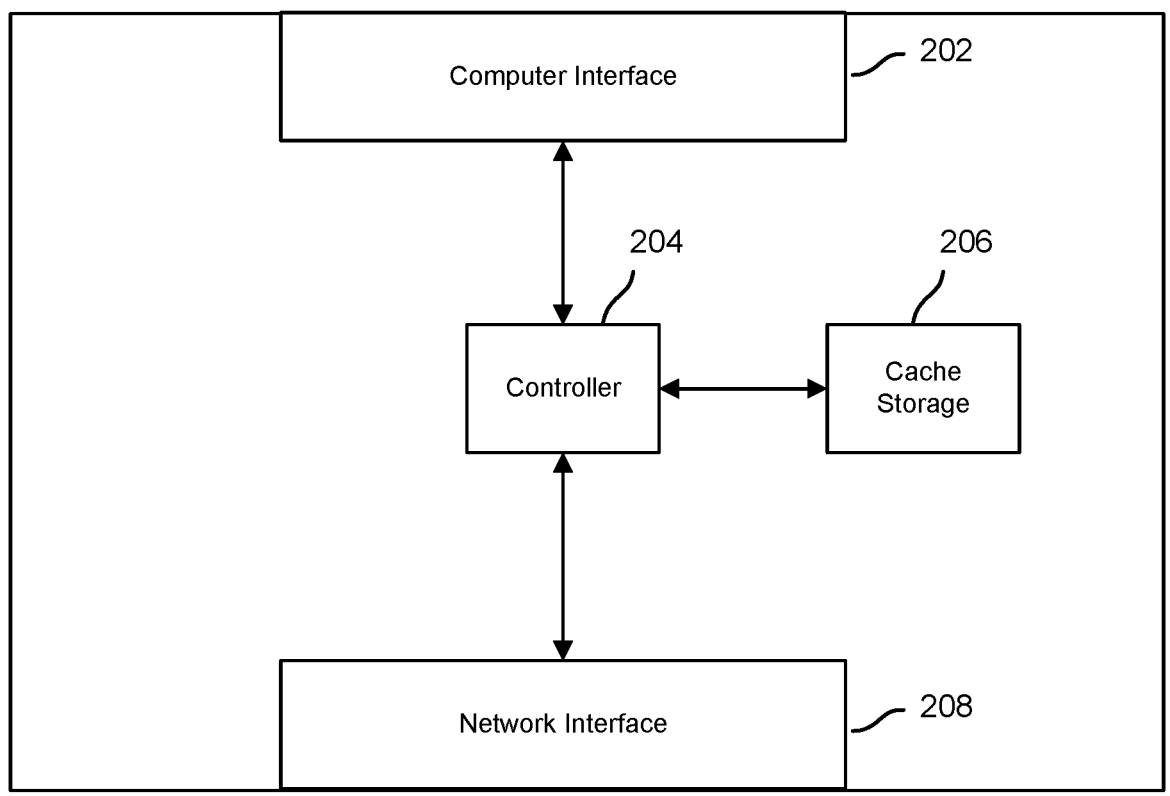
FIG. 2 is a block diagram illustrating an embodiment of a network interface controller.

FIG. 2 is a block diagram illustrating an embodiment of a network interface controller. NIC 200 may be implemented as a NIC, such as NIC 104, 114, 124.

NIC 200 is comprised of computer interface 202, controller 204, cache storage 206, and network interface 208. NIC 200 may be associated with a host computer system. The host computer system may store a portion of a distributed table. Controller 204 may send to the host computer system via computer interface 202 a request for a subset of the data included in the distributed table portion. In response to the request, the host computer system may lookup the requested data and provide the requested data to controller 204 via computer interface 202. In response to receiving the requested data controller 204 may store the requested data in cache storage 206. The subset of the data included in the distributed table portion may correspond to a most frequently accessed subset of the distributed table portion (e.g., accessed more than a threshold number of times within a specified duration).

NIC 200 may receive at network interface 208 a request for data stored by the host computer system. NIC 200 may determine whether the request is associated with cacheable data (e.g., data associated with a distributed table). The request for data stored by the host computer system may be comprised of a plurality of data packets. Controller 204 may inspect a header associated with the plurality of data packets. The header associated with the plurality of data packets may include an indication that the requested data is associated with a distributed table portion stored by the host computer system associated with NIC 200. In the event the header associated with the plurality of data packets does not include the indication that the requested data is associated with the distributed table portion stored by the host computer system associated with NIC 200 (i.e., the request is not associated with cacheable data), controller 204 may provide the request to the host computer system via computer interface 200. In the event the header associated with the plurality of data packets does include the indication that the requested data is associated with the distributed table portion stored by the host computer system associated with NIC 200 (i.e., the request is associated with cacheable data), controller 204 may inspect cache storage 206 to determine whether the requested data is stored in cache storage 206. In the event the requested data is stored in cache storage 206, controller 204 may retrieve the requested data from cache storage 206 and provide the requested data to the requesting host computer system via network interface 208. In the event the requested data is not stored in cache storage 206, controller 204 may send the request to a host computer system via computer interface 202. The computer node may lookup the requested data and provide the requested data to controller 204. In response to receiving the requested data, controller 204 may store the requested data in cache storage 206 and provide the requested data to the requesting host computer system via network interface 208. The requested data may overwrite data stored in cache storage 206. In some embodiments, a least recently used policy is implemented and the requested data overwrites the least recently used data stored in cache storage 206.

Controller 204 may receive via network interface 208 a request to update data associated with a distributed table portion. Controller 204 may determine whether the update request is associated with data stored in cache storage 206. In the event the update request is associated with data stored in cache storage 206, controller 204 may update the data stored in cache storage 206. In some embodiments, NIC 200 is configured to directly communicate with a memory of a computing device to which NIC 200 is associated. NIC 200 may directly update the distributed table portion stored in a memory of the computing device with the updated data. In some embodiments, NIC 200 is configured to indirectly communicate with a memory of a computing device to which NIC 200 is associated. NIC 200 may provide the updated data to a processor of the host computer system when the host computer system has available cores to perform the update. In the event the update request is not associated with data stored in cache storage 206, controller 204 may provide the update request to a host computer system via computer interface 202.

Figure 3:
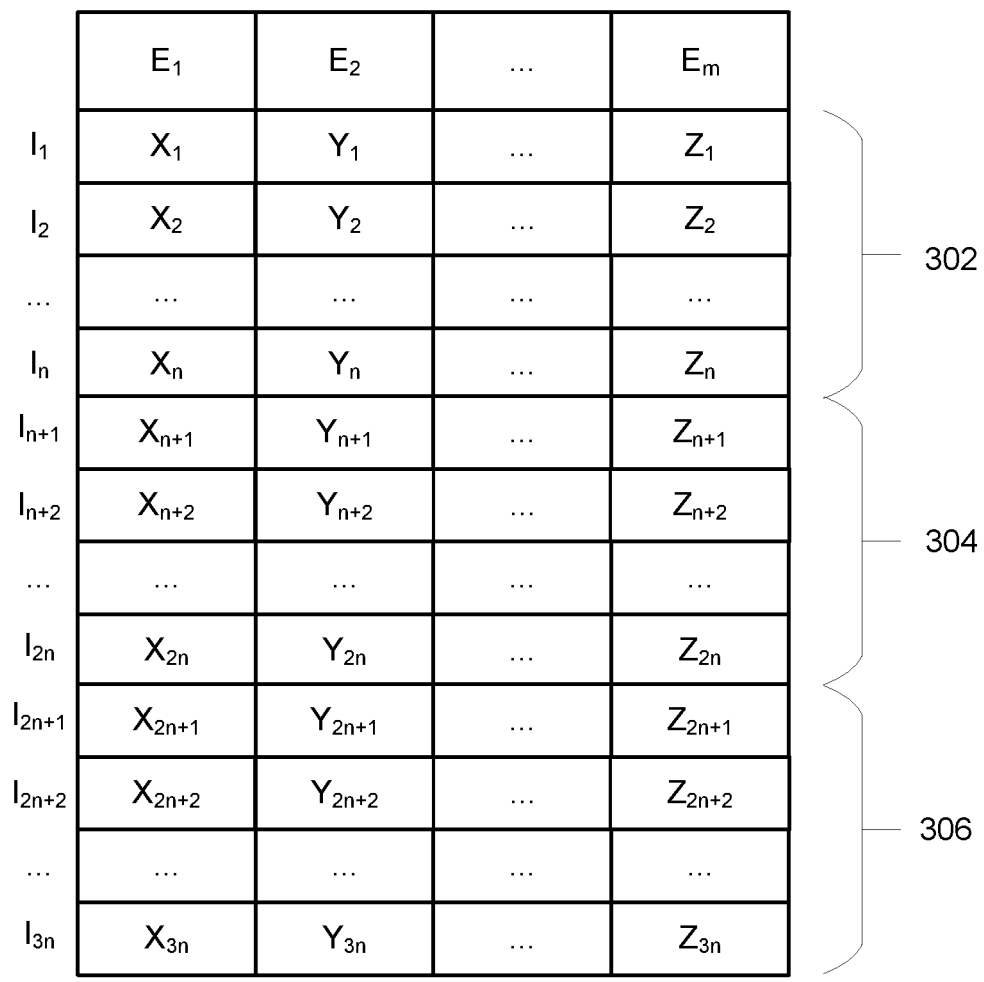
FIG. 3 is a table illustrating an embodiment of a distributed table.

FIG. 3 is a table illustrating an embodiment of a distributed table. In the example shown, distributed table 300 is comprised of a plurality of portions 302, 304, 306. A memory of a host computer system may store one of the plurality of portions 302, 304, 306. Although the example depicts distributed table 300 being comprised of three portions, distributed table 300 may be comprised of N portions. In some embodiments, distributed table 300 corresponds to an embedding table.

Distributed table 300 is comprised of m elements. In some embodiments, the number of elements is 64. In some embodiments, the number of elements $m=2^a$, where a is a positive number. An entry may correspond to an entity, such as a person, place, good, service, item, etc. The entity may be represented by the element values. An element value may be an integer, a floating point number, a text string, etc.

First distributed table portion 302 is comprised of entries $I_1$ to $I_n$. Each of the entries included in first distributed table portion 302 is associated with a plurality of elements. Second distributed table portion 304 is comprised of entries $I_{n+1}$ to $I_{2n}$. Each of the entries included in second distributed table portion 304 is associated with a plurality of elements. Third distributed table portion 306 is comprised of entries $I_{2n+1}$ to $I_{3n}$. Each of the entries included in third distributed table portion 306 is associated with a plurality of elements.

First distributed table portion 302 may be stored in a memory of a first host computer system, for example, memory 102 of host computer system 101. Second distributed table portion 304 may be stored in a memory of a second host computer system, for example, memory 112 of host computer system 111. Third distributed table portion 306 may be stored in a memory of a third host computer system, for example, memory 122 of host computer system 121.

A subset of the first distributed table portion 302 may be stored in a cache storage of NIC associated with a host computer system. For example, the subset of first distributed table portion 302 may be stored in a cache storage of NIC 104. A subset of the second distributed table portion 304 may be stored in a cache storage of NIC associated with a host computer system. For example, the subset of the second distributed table portion 304 may be stored in a cache storage of NIC 114. A subset of the third distributed table portion 306 may be stored in a cache storage of NIC associated with a host computer system. For example, the subset of the third distributed table portion 306 may be stored in a cache storage of NIC 124. In some embodiments, the subset of a distributed table portion stored in a cache storage of a NIC associated with a host computer system may correspond to the most frequently accessed entries associated with the distributed table portion subset.

In some embodiments, one or more entries of a distributed table portion are requested and not stored in a cache storage of a NIC associated with the host computer system. The host computer system may provide to the NIC associated with the host computer system data associated with the one or more requested entries. The data associated with the one or more requested entries may be stored in the cache storage of the NIC associated with the host computer system. The cache storage of the NIC may implement a least recently used eviction policy. The data associated with the one or more requested entries may overwrite the least recently used entries of the distributed table portion subset stored in the cache storage of the NIC.

Figure 4:
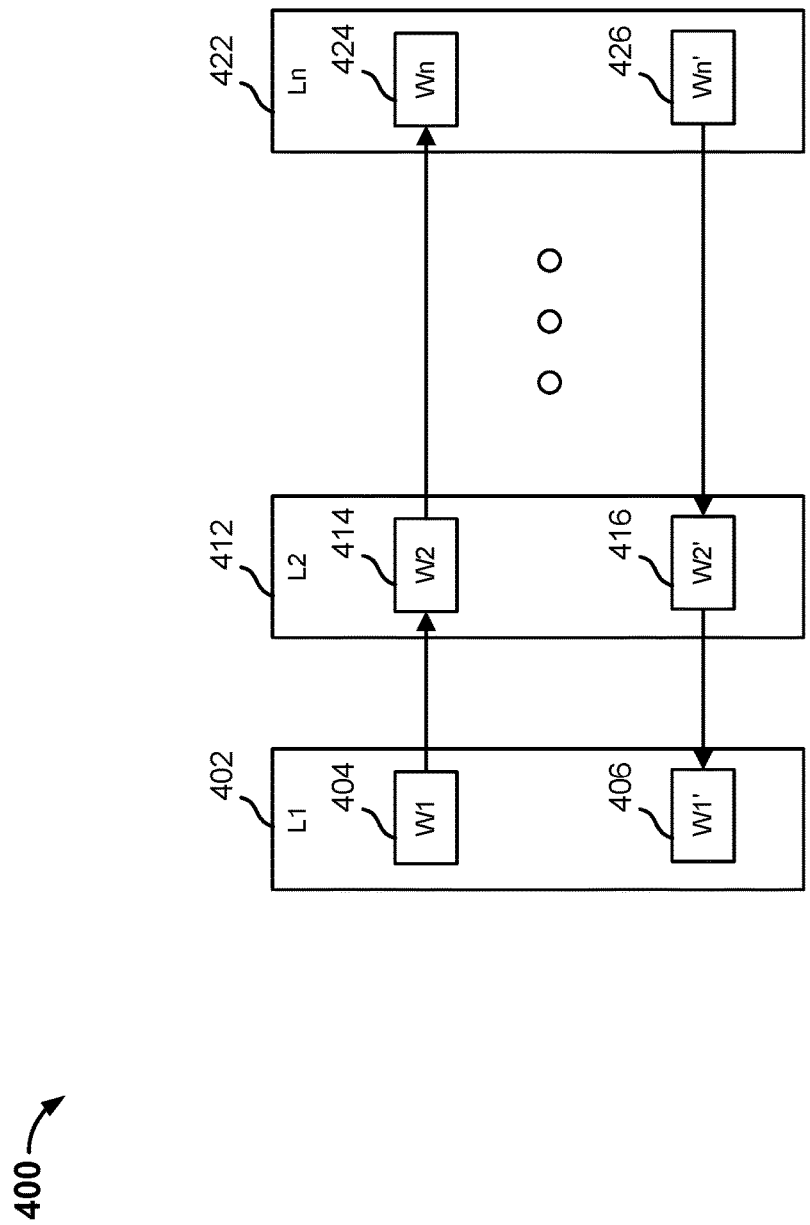
FIG. 4 is a block diagram illustrating a machine learning model in accordance with some embodiments.

FIG. 4 is a block diagram illustrating a machine learning model in accordance with some embodiments. In the example shown, machine learning model 400 is comprised of layers 402, 412, 422. Although the example illustrates machine learning model 400 as having three layers, machine learning model 400 may be comprised of n layers.

Each of the layers is associated with a corresponding weight. Layer 402 is associated with weight 404, layer 412 is associated with weight 414, and layer 422 is associated with weight 424. In the forward pass, input data may be applied to layer 402. Input data may correspond to data associated with a distributed table (e.g., one or more entries of the distributed table). Layer 402 may apply weight 404 (e.g., a weighted function) to the input data and output a value. The output of layer 402 may be provided as input to layer 412. Layer 412 may apply weight 414 to the data outputted by layer 402 and output a value. The output of layer 412 may be provided as input to layer 422. Layer 422 may apply weight 424 to the data outputted by layer 412 and output a value. The value outputted by layer 422 may correspond to a prediction.

A host computer system may receive feedback based on its prediction and determine that its corresponding machine learning models need to be updated to provide more accurate predictions in the future. An updated weight for layer 422 may be determined. In some embodiments, the updated weight is shared with one or more other host computer systems. The one or more other host computer systems may share their corresponding updated weights for layer 422. A collective weight 426 may be determined for layer 422. An updated weight for layer 412 may be determined. In some embodiments, the updated weight is shared with one or more other host computer systems. The one or more other host computer systems may share their corresponding updated weights for layer 412. A collective weight 416 may be determined for layer 412. An updated weight for layer 402 may be determined. In some embodiments, the updated weight is shared with one or more other host computer systems. The one or more other host computer systems may share their corresponding updated weights for layer 402. A collective weight 416 may be determined for layer 412.

Figure 5:
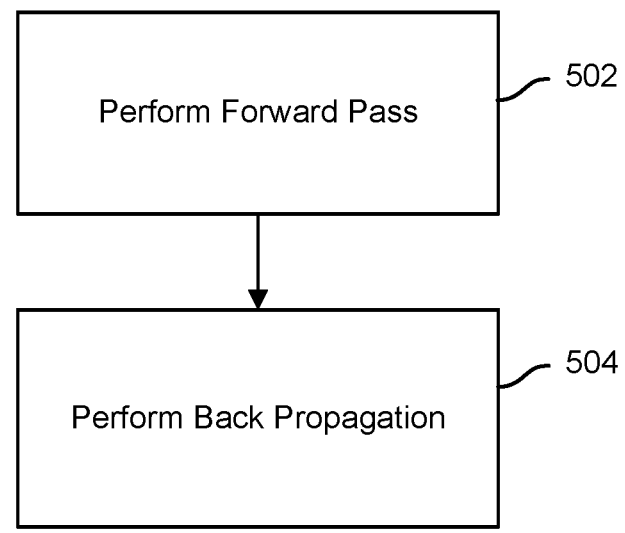
FIG. 5 is a flow diagram illustrating an embodiment of a process for machine learning.

FIG. 5 is a flow diagram illustrating an embodiment of a process for machine learning. In the example shown, process 500 may be implemented by a host computer system, such as host computer systems 101, 111, 121.

At 502, a forward pass is performed. Input data may be applied to a machine learning model of a host computer system and a prediction is outputted by the host computer system. In some embodiments, the input data is data associated with a distributed table, such as an embedding table.

At 504, a back propagation is performed. The machine learning model may be updated. The machine learning model may be comprised of a plurality of layers where each layer is associated with a corresponding weight. The corresponding weights associated with each layer of the machine learning model may be updated. In some embodiments, the corresponding weights associated each layer of the machine learning model is shared with one or more other host computer systems and a collective weight is determined for each layer of the machine learning model.

Figure 6:
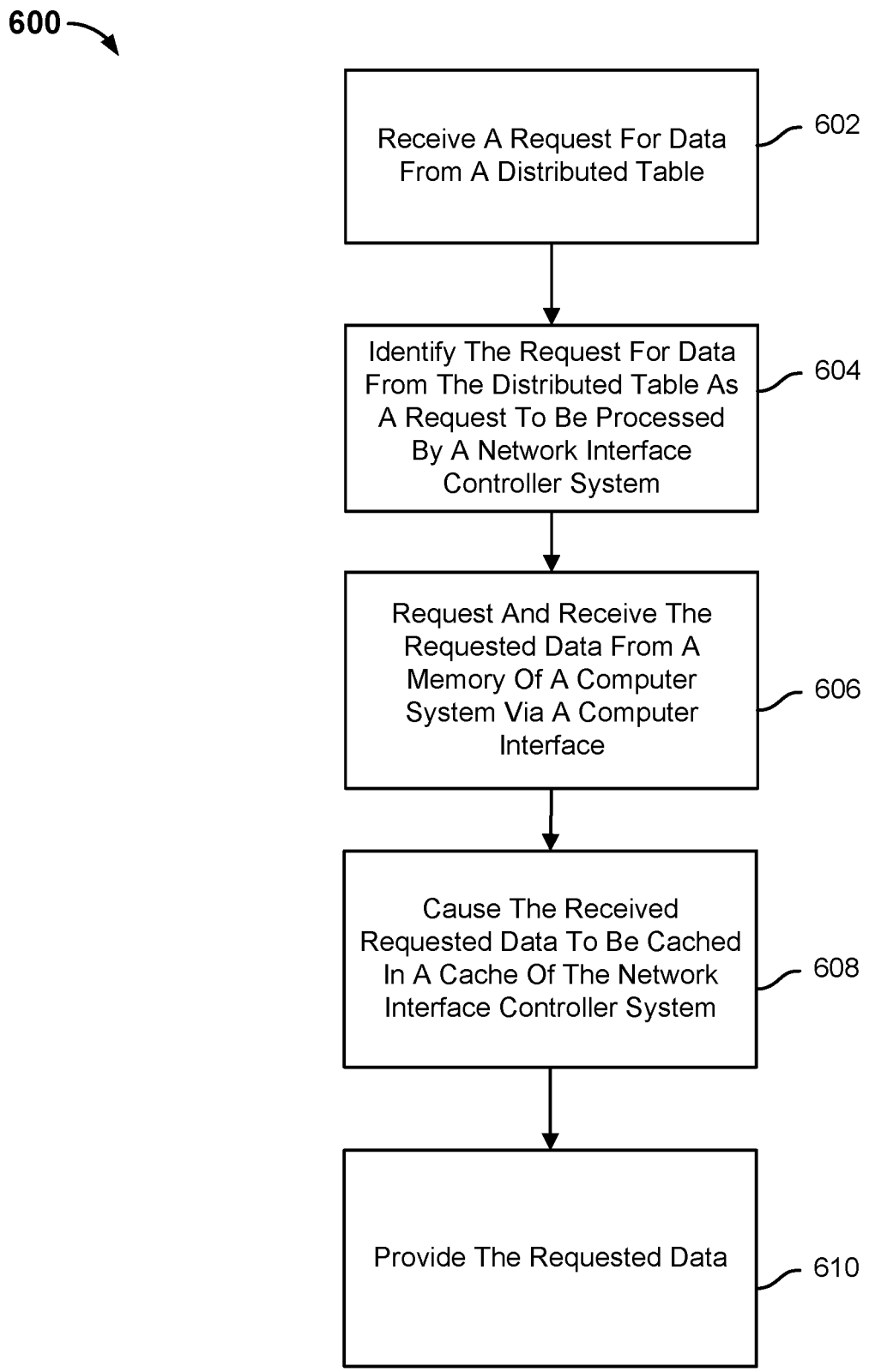
FIG. 6 is a flow diagram illustrating an embodiment of a process for retrieving data.

FIG. 6 is a flow diagram illustrating an embodiment of a process for retrieving data. In the example shown, process 600 may be implemented by a NIC, such as NIC 104, NIC 114, or NIC 124.

At 602, a request for data from a distributed table is received. The distributed table may be divided into a plurality of portions. A distributed system may be comprised of a plurality of host computer systems. The request may be received from any of the other host computer systems of the distributed system.

Each of the host computer systems have a corresponding memory. Each of the host computer systems may store a corresponding portion of the distributed table. In some embodiments, the request for data from the distributed table corresponds to a subset of the data included in distributed table portion stored in a memory of a host computer system. In some embodiments, the request for data from the distributed table corresponds to all of the data included in the distributed table portion stored in the memory of the host computer system.

At 604, the request for data from the distributed table is identified as a request to be processed by a network interface controller system. The request for data from the distributed table may be comprised of a plurality of packets. The plurality of packets may have an associated header. The request may be identified as a request for data from the distributed table in the event the header associated with the request includes an indication that indicates the request is for data from the distributed table.

At 606, the requested data from a memory of a computer system is requested and received via a computer interface. The request may be provided to a host computer system to which the NIC that received the request is associated. In response to receiving the request, a processor of the host computer system may retrieved the requested data from a memory of the host computer system and provide the retrieved data to the NIC.

At 608, the received requested data is cause to be cached in a cache of the network interface controller system. A controller of the NIC may cause the retrieved data to be stored in a cache storage of the NIC.

At 610, the requested data is provided to a requesting node of the distributed system.

Figure 7:
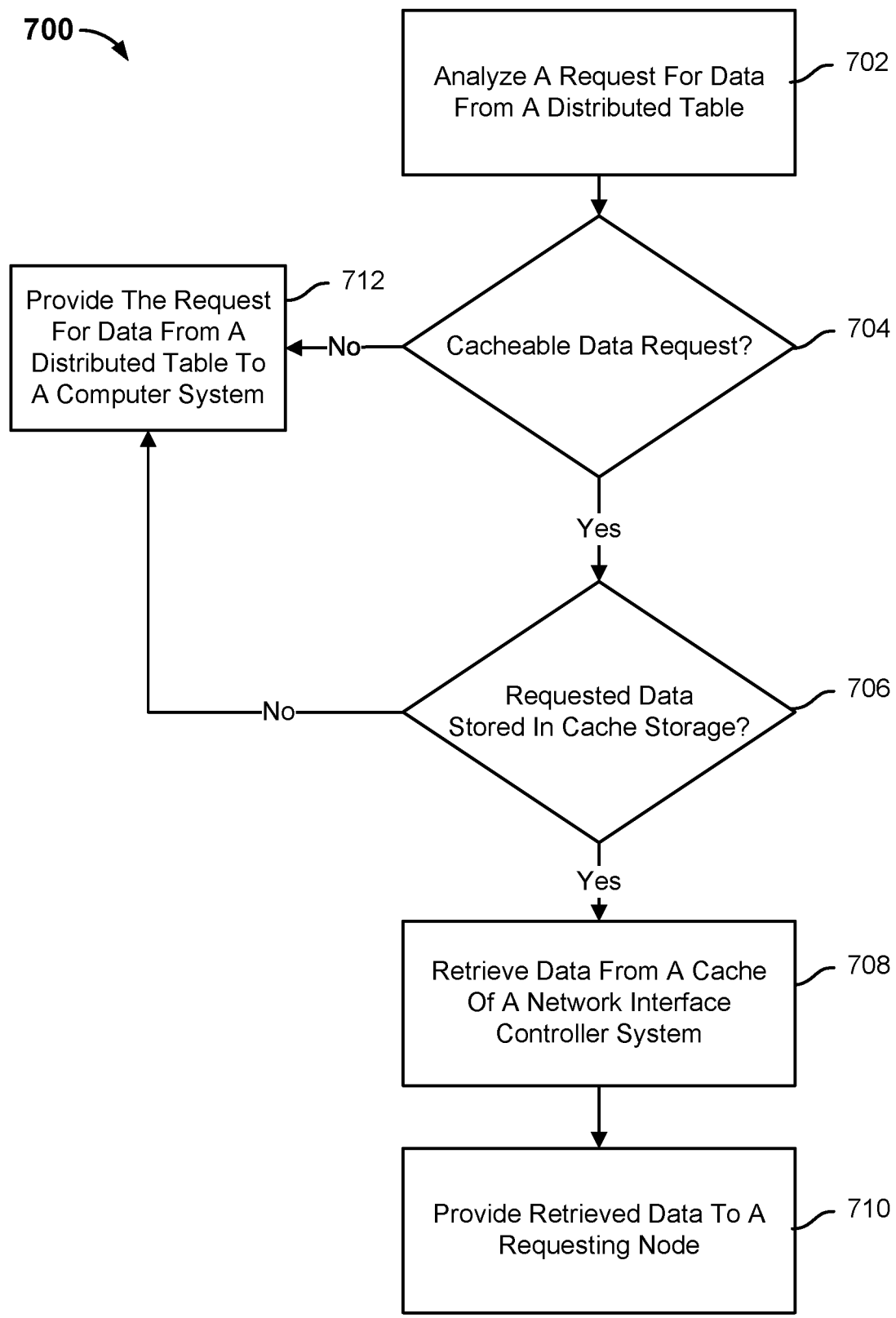
FIG. 7 is a flow diagram illustrating an embodiment of a process for retrieving data.

FIG. 7 is a flow diagram illustrating an embodiment of a process for retrieving data. In the example shown, process 700 may be implemented by a NIC, such as such as NIC 104, NIC 114, or NIC 124.

At 702, a request for data from a distributed table is analyzed. The distributed table may be divided into a plurality of portions. A distributed system may be comprised of a plurality of host computer systems. The request may be received at a host computer system from any of the other host computer systems of the distributed system.

Each of the host computer systems have a corresponding memory and store a corresponding portion of the distributed table in the corresponding memory. In some embodiments, the request for data from the distributed table corresponds to a subset of the data included in distributed table portion stored in a memory of a host computer system. In some embodiments, the request for data from the distributed table corresponds to all of the data included in the distributed table portion stored in the memory of the host computer system. The request for data from the distributed table may be comprised of a plurality of packets. The plurality of packets may have an associated header. The associated header of the plurality of packets may be analyzed.

At 704, it is determined whether the request is associated with cacheable data. The cacheable data may correspond to data from a distributed table. A controller of the NIC may determine whether the header associated with the request includes an indication that indicates the request is for data from the distributed table. In the event the request includes the indication that indicates the request is for data from the distributed table (i.e., the request is associated with cacheable data), process 700 proceeds to 706. In the event the request does not include the indication that indicates the request is for data from the distributed table (i.e., the request is not associated with cacheable data), process 700 proceeds to 712.

At 706, it is determined whether the requested data from a distributed table is stored in a cache storage of the NIC. The cache storage of the NIC may store a subset of a distributed table portion stored in a memory of a host computer system to which the NIC is associated. The request may be for data included in the subset of the distributed table portion stored in the cache storage. The request may be for data of the distributed table portion that is not stored in the cache storage, but stored in the memory of the host computer system to which the NIC is associated.

In the event the request is for data from a distributed table stored in the cache storage of the NIC, process 700 proceeds to 708. In the event the request is for data from a distributed table that is not stored in the cache storage of the NIC, but for data from a distributed table stored in a memory of a host computer system, process 700 proceeds to 708.

At 708, the requested data is retrieved from a cache storage of the NIC. At 710, the retrieved data is provided to a requesting host computer system.

Figure 8:
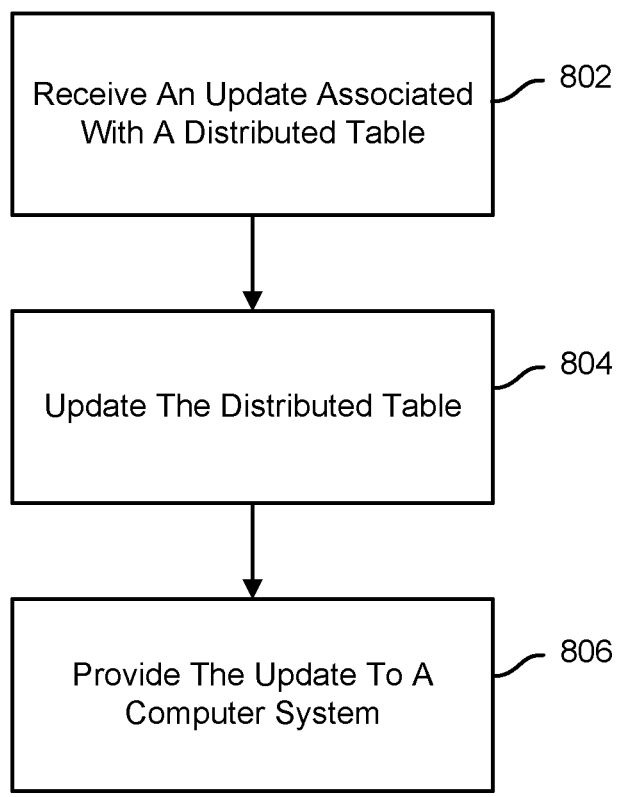
FIG. 8 is a flow diagram illustrating an embodiment of a process for updating a distributed table.

FIG. 8 is a flow diagram illustrating an embodiment of a process for updating a distributed table. In the example shown, process 800 may be implemented by a NIC, such as NIC 104, NIC 114, and NIC 124.

At 802, an update associated with a distributed table is received. The distributed table may be divided into a plurality of portions. A distributed system may be comprised of a plurality of host computer systems. Each of the host computer systems have a corresponding memory. Each of the host computer systems may store a corresponding portion of the distributed table. A NIC associated with a host computer system may store a subset of a distributed table portion stored by a host computer system to which the NIC is associated. The updated associated with the distributed table may be correspond to the subset of the distributed table portion stored in a cache storage of a NIC.

At 804, the distributed table is updated. A controller of a NIC may receive the update associated with the distributed table and update the subset of the distributed table portion stored in the cache storage of the NIC. For example, the subset of the distributed table portion may be comprised of a plurality of entries. Each entry is associated with a plurality of elements. One or more values associated with one or more corresponding elements of an entry may be updated.

At 806, the update is provided to a computer system. In some embodiments, a NIC may directly communicate with a memory of a host computer system to which the NIC is associated. A controller of the NIC may update the distributed table portion stored in the memory of the host computer system. In some embodiments, a NIC may indirectly communicate with a memory of a host computer system to which the NIC is associated by providing the updated associated with the distributed table to a processor of the host computer system. In response to receiving the update associated with the distributed table, the processor of the host computer system may update the distributed table portion stored in the memory of the host computer system.

Figure 9:
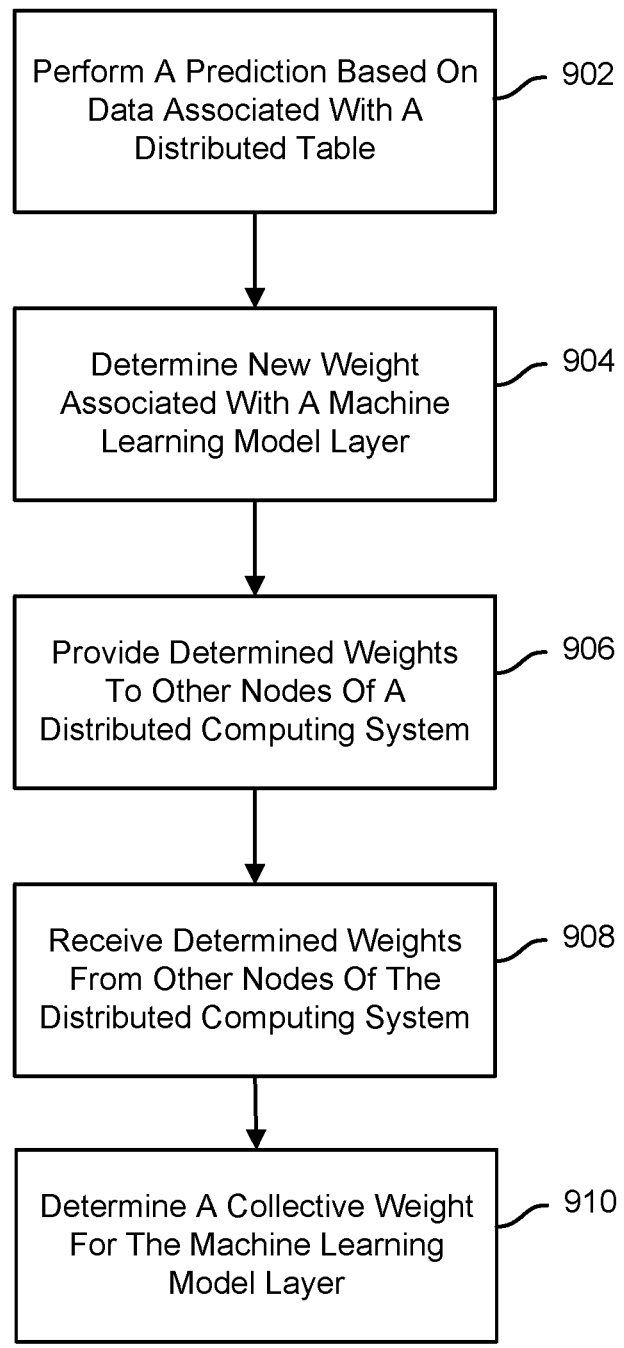
FIG. 9 is a flow diagram illustrating an embodiment of a process for updating a machine learning model.

FIG. 9 is a flow diagram illustrating an embodiment of a process for updating a machine learning model. In the example shown, process 900 may be implemented by a processor, such as processor 103, processor 113, and processor 123.

At 902, a prediction based on data associated with a distributed table is performed. A processor of a host computer system may determine that its associated machine learning model needs to be updated to perform a more accurate prediction.

At 904, a new weight associated with a machine learning model layer is determined. A machine learning model may be comprised of a plurality of layers. Each layer may have a corresponding weight. A processor of a host computer system may determine an updated weight for a layer.

At 906, the determined weight is provide to other nodes of a distributed computing system. The other nodes of the distributed computing system may have performed corresponding predictions and determined corresponding adjustments to their corresponding machine learning models. At 908, determined weights from other nodes of the distributed computing system are received.

At 910, a collective weight for the machine learning model layer is determined. The collective weight is based on the weight determined by the host computer system and the weights determined by the other nodes of the distributed computing system.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A network interface controller (NIC) system, comprising:
   a network interface configured to interface with a network and receive a request for data from a distributed table;
   a computer interface configured to provide data to a host computer system connected to the NIC system;
   a cache configured to cache data of the distributed table; and
   a controller configured to:
      identify the request for data from the distributed table as a request to be processed by the NIC system instead of a processor of the host computer system;
      request and receive the requested data from a memory of the host computer system via the computer interface; and
      cause the received requested data to be cached in the cache of the NIC system.

2. The network interface controller system of claim 1, wherein the distributed table is an embedding table.

3. The network interface controller system of claim 1, wherein the network interface is configured to provide the received requested data to a second host computer system.

4. The network interface controller system of claim 3, wherein the network interface is configured to receive from the second host computer system an update for the provided data.

5. The network interface controller system of claim 4, wherein the controller is configured to update the data from the distributed table cached in the cache of the network interface controller system.

6. The network interface controller system of claim 5, wherein the controller is configured to update the memory of the host computer system based on the update for the provided data.

7. The network interface controller system of claim 1, wherein the host computer system and a second host computer system are included in a distributed computing system.

8. The network interface controller system of claim 1, wherein the memory of the host computer system is configured to store a portion of the distributed table.

9. The network interface controller system of claim 8, wherein the request for data from the distributed table is for a subset of the portion of the distributed table.

10. The network interface controller system of claim 8, wherein the request for data from the distributed table is for an entire portion of the distributed table.

11. The network interface controller system of claim 1, wherein the controller is configured to identify the request for data from the distributed table as a request to be processed by the network interface controller system based on a header associated with the request.

12. The network interface controller system of claim 1, wherein the network interface is configured to receive a second request for data from the distributed table.

13. The network interface controller system of claim 12, wherein the controller is configured to:
   identify the second request for data from the distributed table as a request to be processed by the network interface controller system; and
   determine whether the data from the distributed table associated with the second request is cached in the cache of the network interface controller system.

14. The network interface controller system of claim 13, wherein in response to a determination that the data from the distributed table associated with the second request is cached in the cache of the network interface controller system, the controller is configured to:
   retrieve from the cache of the network interface controller system the data from the distributed table associated with the second request; and
   provide the data from the distributed table associated with the second request.

15. The network interface controller system of claim 13, wherein in response to a determination that the data from the distributed table associated with the second request is not cached in the cache of the network interface controller system, the controller is configured to provide the second request to the host computer system via the computer interface.

16. A method, comprising:
   receiving, at a network interface controller system, a request for data from a distributed table;
   identifying the request for data from the distributed table as a request to be processed by the network interface controller system instead of a processor of a host computer system;
   requesting and receive the requested data from a memory of the host computer system via a computer interface of the network interface controller system; and
   causing the received requested data to be cached in a cache of the network interface controller system.

17. The method of claim 16, further comprising providing the received requested data to a second host computer system.

18. The method of claim 16, wherein the request for data from the distributed table is identified as a request to be processed by the network interface controller system based on a header associated with the request.

19. The method of claim 16, further comprising:
   receiving a second request for data from the distributed table;
   identifying the second request for data from the distributed table as a request to be processed by the network interface controller system; and
   determine whether the data from the distributed table associated with the second request is cached in the cache of the network interface controller system.

20. A computer program product, the computer program product being embodied in a non-transitory computer readable storage medium and comprising computer instructions for:
   receiving, at a network interface controller system, a request for data from a distributed table;
   identifying the request for data from the distributed table as a request to be processed by the network interface controller system instead of a processor of a host computer system;
   requesting and receive the requested data from a memory of the host computer system via a computer interface of the network interface controller system; and causing the received requested data to be cached in a cache of the network interface controller system.

* * * * *